G. HAYES.
Ventilator.

No. 8,597. Reissued Feb. 25, 1879.

Witnesses.
George A. Hayes
Elizabeth Hafkein

Inventor.
George Hayes.

THE NORRIS PETERS CO., PHOTO-LITHO., WASHINGTON, D. C.

UNITED STATES PATENT OFFICE.

GEORGE HAYES, OF NEW YORK, N. Y.

IMPROVEMENT IN VENTILATORS.

Specification forming part of Letters Patent No. 94,203, dated August 31, 1869; Reissue No. 8,597, dated February 25, 1879; application filed January 21, 1879.

*To all whom it may concern:*

Be it known that I, GEORGE HAYES, of the city, county, and State of New York, have invented a new and useful Improvement in Ventilation, of which the following is a specification:

This invention relates to a method of constructing and arranging ventilators on buildings, houses, stores, &c., and in conjunction with skylights and similar structures; and my invention consists of a metallic ridge-box arranged to fit over or into the rafters of a sloping roof or skylight, the said box open below to the interior of the building or skylight, and having vertical walls or facing to a proper height above the roof, and at such suitable point provided with a cap broader than said boxing or casing, and carried up to a suitable height above the same, overhanging sufficiently to cause air that may have risen within aforesaid casing to pass within the inclosure of the cap or chamber caused thereby, and escape downward or outward from beneath the outer edge thereof. In combination therewith a regulating-damper is provided, so that the passage may be shut off partially or wholly at pleasure, and snow or rain excluded. Also, in combination therewith, I provide an interior flange arranged vertically within the case or box, and so that a space or flue is formed around next the walls thereof, and I provide apertures through said walls at any suitable point, so that air may pass inward and upward within said flue-space to assist the draft, and an outside flange is provided to cover the joining of the roof and make all tight. I also provide outlet-apertures to permit escape of water from said flue-space should any find its way therein.

Figure 1:
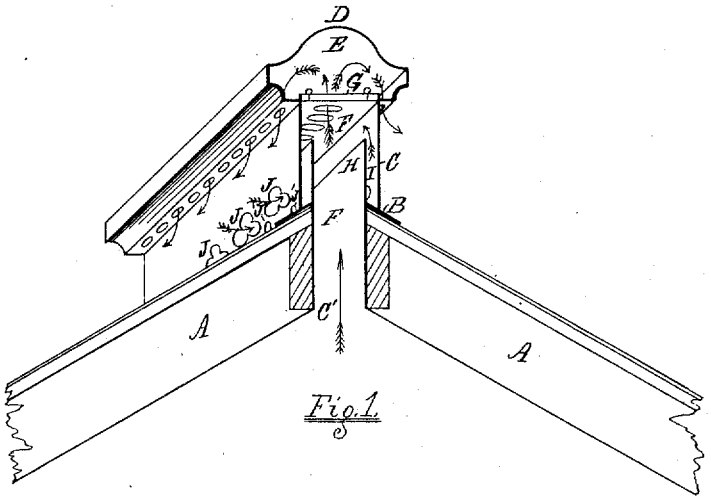
Figure 2:
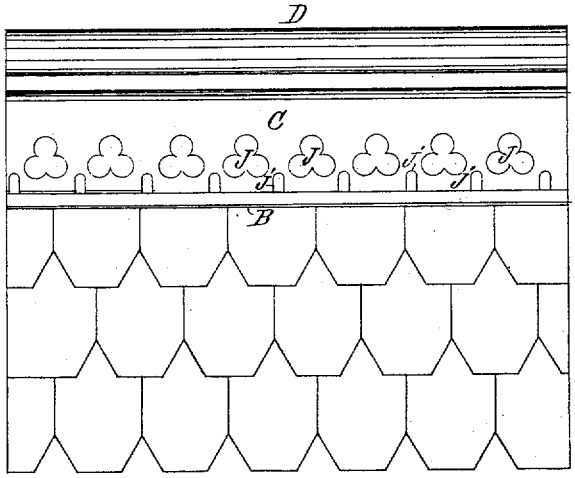

In the accompanying drawings, Figure 1 represents a vertical section and perspective view of my arrangement as applied to the peak of a roof covered with slates, arrows showing courses of air-currents. Fig. 2 is an elevation of the same.

Like letters indicate like parts.

A represents rafters; B, a metal flange overlapping the joining; C, a frame, casing, facing, or boxing, forming main body of the ventilator, and above which is placed the cap D, which, rising above and overhanging, forms a finish thereto, at the same time providing a chamber, E, within.

The boxing C is open below at C′ to the interior of structure ventilated, and its interior forms the space or chamber marked F. The two chambers E and F are divided by damper G, located wherever suitable. H shows interior vertical flange forming air-space I, and at J are inlet-openings thereto, J′ being drip-openings through which water may escape.

The damper G may be regulated by cord and pulley, as desired.

Having thus described my invention, what I claim, and desire to secure by Letters Patent, is—

1. A hollow metallic ridge-box, in combination with rafters of a sloping roof, skylight, or other suitable structure, forming a ventilator, the said ventilator or ridge-box open below to interior of structure, and having vertical faces provided with a flange covering the joining of the rafters, &c., and with an overhanging roof or cap so arranged that air must pass over the vertical facing aforesaid, and under the outer edge of the cap, substantially as shown and specified.

2. In combination with rafters of a sloping roof of a building, skylight, or other suitable structure, a boxing so formed as to constitute a hollow metallic ridge or capping thereto, sitting over or into the same, and of any suitable length, open below to the interior of structure, having vertical faces provided with an outside flange to cover the joining, and having a raised and overhanging cap, arranged substantially as and for the purpose described and set forth.

3. In a skylight-ventilator, the combination of the chambers E and F, provided with damper G, arranged substantially as shown and described.

4. The metallic flange B, the frame or boxing C, the damper G, and cap D, constructed and combined substantially as shown and described, and for the purpose set forth.

GEORGE HAYES.

In presence of—

GEORGE A. HAYES,
ELIZABETH HOPKINS.